United States Patent
Zhang et al.

(10) Patent No.: US 12,056,533 B2
(45) Date of Patent: Aug. 6, 2024

(54) METHOD, APPARATUS AND MEDIUM FOR OPTIMIZING ALLOCATION OF SWITCHING RESOURCES IN POLYMORPHIC NETWORK

(71) Applicant: ZHEJIANG LAB, Zhejiang (CN)

(72) Inventors: Huifeng Zhang, Hangzhou (CN); Congqi Shen, Hangzhou (CN); Tao Zou, Hangzhou (CN); Jun Zhu, Hangzhou (CN); Ruyun Zhang, Hangzhou (CN); Qi Xu, Hangzhou (CN); Hanguang Luo, Hangzhou (CN); Xingchang Guo, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/354,601

(22) Filed: Jul. 18, 2023

(65) Prior Publication Data
US 2024/0143403 A1   May 2, 2024

Related U.S. Application Data

(63) Continuation of application No. PCT/CN2023/075692, filed on Feb. 13, 2023.

(30) Foreign Application Priority Data

Nov. 2, 2022   (CN) .......................... 202211362948.2

(51) Int. Cl.
*G06F 9/46* (2006.01)
*G06F 9/50* (2006.01)
*G06N 20/00* (2019.01)

(52) U.S. Cl.
CPC .......... *G06F 9/5038* (2013.01); *G06N 20/00* (2019.01)

(58) Field of Classification Search
CPC .............................. G06F 9/5038; G06N 20/00
See application file for complete search history.

(56) References Cited

U.S. PATENT DOCUMENTS

| | | |
|---|---|---|
| 2013/0314225 A1 | 11/2013 | Baker |
| 2017/0257388 A1 | 9/2017 | Addepalli et al. |

(Continued)

FOREIGN PATENT DOCUMENTS

| | | |
|---|---|---|
| AU | 2014201105 A1 | 3/2014 |
| AU | 2013200999 B2 | 12/2016 |

(Continued)

OTHER PUBLICATIONS

International Search Report (PCT/CN2023/075692); Date of Mailing: May 17, 2023.

(Continued)

*Primary Examiner* — Gregory A Kessler
(74) *Attorney, Agent, or Firm* — W&G Law Group

(57) ABSTRACT

A method, an apparatus and a medium for optimizing allocation of switching resources in the polymorphic network. The method selects the ASIC switching chip, FPGA and PPK software switching on the polymorphic network element based on machine learning, and specifically comprises the following steps: manually pre-configuring, formulating basic rules for polymorphic software and hardware co-processing; offline learning, designing training configuration in the offline learning stage to capture different switching resource usage variables, running experiments to generate the original data of a training classifier, and using the generated performance indices to train the model offline; and online reasoning, obtaining switching resource allocation advises, and updating modality codes according to the switching resource allocation advises.

10 Claims, 2 Drawing Sheets

(56) References Cited

U.S. PATENT DOCUMENTS

| | | | |
|---|---|---|---|
| 2018/0247185 | A1 | 8/2018 | Chung et al. |
| 2019/0244095 | A1 | 8/2019 | Huang et al. |
| 2020/0013176 | A1 | 1/2020 | Kang et al. |

FOREIGN PATENT DOCUMENTS

| | | | |
|---|---|---|---|
| CN | 1311853 | A | 9/2001 |
| CN | 103221093 | A | 7/2013 |
| CN | 104270392 | A | 1/2015 |
| CN | 106573375 | A | 4/2017 |
| CN | 107252305 | A | 10/2017 |
| CN | 107689931 | A | 2/2018 |
| CN | 107704656 | A | 2/2018 |
| CN | 107794221 | A | 3/2018 |
| CN | 109087106 | A | 12/2018 |
| CN | 109750885 | A | 5/2019 |
| CN | 110058201 | A | 7/2019 |
| CN | 110569282 | A | 12/2019 |
| CN | 213464972 | U | 6/2021 |
| CN | 114115834 | A | 3/2022 |
| CN | 114938322 | A | 8/2022 |
| CN | 115426265 | A | 12/2022 |
| EP | 3532988 | A1 | 9/2019 |
| RU | 2014150572 | A | 7/2016 |

OTHER PUBLICATIONS

First Office Action(CN202211362948.2); Date of Mailing: Dec. 21, 2022.
Notice of Allowance(CN202211362948.2); Date of Mailing: Jan. 11, 2023.

METHOD, APPARATUS AND MEDIUM FOR OPTIMIZING ALLOCATION OF SWITCHING RESOURCES IN POLYMORPHIC NETWORK

CROSS-REFERENCE TO RELATED APPLICATIONS

The present application is a continuation of International Application No. PCT/CN2023/075692, filed on Feb. 13, 2023, which claims priority to Chinese Application No. 202211362948.2, filed on Nov. 2, 2022, the contents of both of which are incorporated herein by reference in their entireties.

TECHNICAL FIELD

The present disclosure relates to that technical field of computer network, in particular to a method, an apparatus and a medium for optimizing allocation of switching resources in the polymorphic network.

BACKGROUND

The polymorphic network environment is an open network architecture based on a full-dimensional definable platform, which provides a variety of network applications by loading a variety of network modalities (network technologies). The polymorphic network environment includes the existing TCP/IP network technology, new and widely studied technologies in recent years, such as GeoNetworking, Named Data Networking, and MobilityFirst, and even new network technologies that may appear in the future.

The polymorphic network environment supports various network modalities by the full-dimensional definable software and hardware co-processing technology. The device-level network element resources include but are not limited to ASIC, FPGA, PPK (DPDK+T4P4s) soft switch, etc. The execution scheduler of polymorphic network elements receives the target files and configuration files outputted from a target-related back-end compiler, and distributes these files to the execution address or configuration address of heterogeneous targets in turn, so as to execute these files to start the software and hardware switches. In order to improve the performance, it is necessary for network programmers to transmit the information about the use of switching resources to the executive scheduler. It is difficult for network programmers to decide when and how to effectively use switching resources on network elements considering the complexity of the interaction between applications and hardware. Network programmers can add API to the execution scheduler and specify different prompts to improve the performance of switching resources, such as PreferredLocation for ASIC, PreferredLocation for FPGA and PreferredLocation for PPK. However, it is very challenging for programmers to decide when and how to effectively use switching resources for various network modality applications. In order to solve this problem, the present disclosure provides software and hardware co-processing technology based on machine learning. The rules of network modality packets forwarding processing can be dynamically adjusted between software and hardware with the change of service flow, so as to realize automatic switching of switch resources and make the system achieve a high degree of unity in flexibility and high speed.

SUMMARY

The present disclosure provides a method, an apparatus and a medium for optimizing allocation of switching resources in the polymorphic network, aiming at avoiding the fussy manual configuration and possibly causing errors and costs in switching resource allocation of polymorphic network.

The present disclosure is achieved through the following technical solution: a method for optimizing allocation of switching resources in the polymorphic network includes the following steps:

(1) Manual pre-configuration: formulating basic rules for polymorphic software and hardware co-processing, where the basic rules comprise labeling network modality codes of data traffic and sending network modality flow table, and the data traffic comprises elephant flows and mouse flows, labeling the elephant flow as being processed by a hardware module ASIC chip or FPGA, and sending the network modality flow table of the elephant flow to the hardware module ASIC chip or FPGA, and labeling the mouse flow as being processed by a software module PPK.

(2) Offline learning: designing training configuration in an offline learning stage to capture different switching resources usage variables and running experiments to generate original data of a training classifier.

(3) Online reasoning: obtaining switching resource allocation advises, and updating the network modality codes according to the switching resource allocation advises.

Further, the step (2) includes the following sub-steps:

(2.1) Obtaining a training benchmark: according to the basic rules, formulating the network modality codes in various scenarios types as the training benchmark and executing the training benchmark, so as to obtain the benchmark with the best performance facilitating the allocation of switching resources.

(2.2) Extrating features: using a probe to obtain performance indices of a benchmark test in a detailed operation, and extracting the features according to the performance indices, where the detailed operation comprises five stages of processing network modality applications by polymorphic network elements, and the five stages comprise: network modality codes compilation, network modality loading, packets parsing, flow table matching and packets forwarding.

(2.3) Training models: extracting the features using the performance indices extracted in the step (2.2) to evaluate various classifier models, obtaining evaluation indices of the corresponding classifier model, and determining the performance of the classifier model according to the evaluation indices.

Further, the network modalities include spatial coordinate identification modality, identity identification modality, content identification modality, industrial control identification modality and IP identification modality.

Further, the features include CPU occupation, maximum bandwidth, average bandwidth, TCAM occupation, SRAM occupation, PHV occupation, flow table hit time, priority and traffic size.

Further, the classifier model includes random forest, random tree, decision tree, support vector machine and linear regression.

Further, the evaluation indices comprise prediction precision and an F1 measurement value.

The performance of the classifier model can also be verified by a method of 10 times cross validation, and it is necessary to ensure that the training for the classifier model covers all types of data.

Further, the step (3) includes the following sub-steps:
(3.1) Collecting the performance indices: obtaining the performance indices by a probe when the features are running and normalized indices, and combining the performance indices and normalized indices into one feature vector.
(3.2) Input into the model: obtaining the switching resources allocation advises, and inputting the feature vector into the model that is trained offline. The model outputs the predicted switching resource allocation advises, and the switching resource allocation advises comprise:no advise, PreferredLocation for ASIC, PreferredLocation for FPGA and PreferredLocation for PPK.
(3.3) Updating of the network modality codes: modifying network modality original codes according to the switching resource allocation advises, so as to realize an optimal selection for use of switching resources.

In a second aspect of the embodiment of the present disclosure, an apparatus for optimizing allocation of switching resources in the polymorphic network is provided, comprising one or more processors for implementing the above method for optimizing allocation of switching resources in the polymorphic network.

In a third aspect of the embodiment of the present disclosure, a computer-readable storage medium on which a program is stored is provided, and the program, when executed by a processor, configured to implement the above method for optimizing allocation of switching resources in a polymorphic network.

The method has the beneficial effects that: based on machine learning, the method selects among ASIC switching chips, FPGA (Field Programmable Gate Array) and PPK soft switch (Polymorphic Process Kit) on polymorphic network elements, and trains a model offline using manual pre-configuration by network programmers and performance indices generated by an analyzer, which is helpful to obtain the most suitable classifier model for different network application scenarios, which is then used to guide an optimal selection and use for polymorphic network applications at runtime, which is conducive to providing excellent advises for switching resource allocation for new applications; according to the present disclosure, I-type polymorphic network elements are used, so that flexible and efficient allocation of software/hardware switching resources on the polymorphic network element is realized, the performance of software/hardware collaborative design is optimized, and the allocation cost of polymorphic network resources is reduced. Further, the method is implemented simply, with flexible means, and the network service quality can be significantly guaranteed.

DESCRIPTION OF EMBODIMENTS

Figure 1:
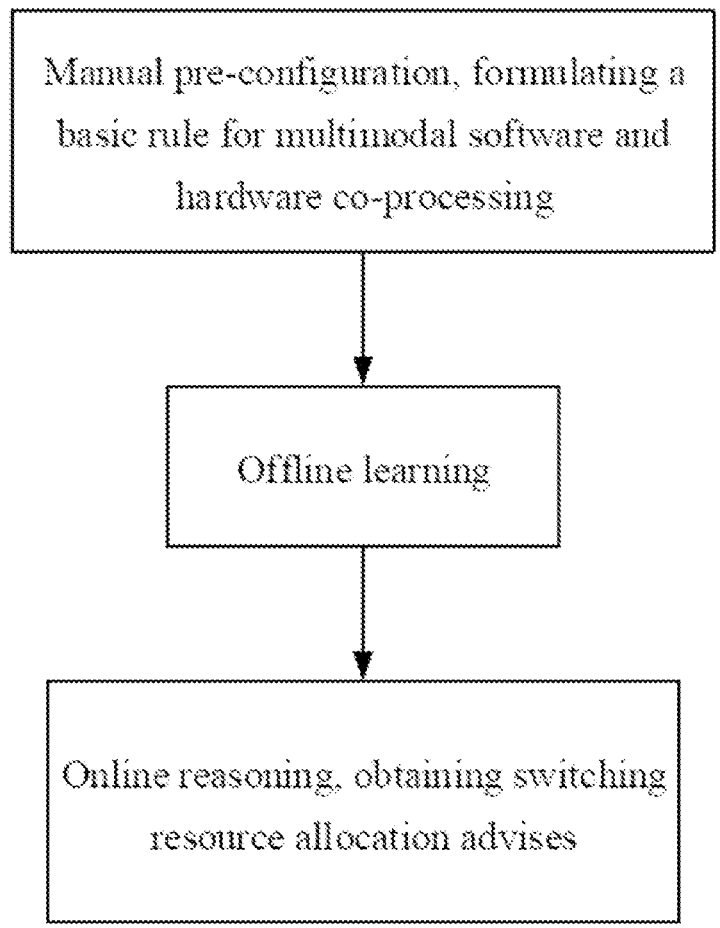
FIG. 1 is a flowchart of an embodiment of the present disclosure.

The method for optimizing allocation of switching resource in the large-scale polymorphic network according to an embodiment of the present disclosure includes the following steps.

(1) Manual pre-configuration: basic rules for polymorphic software and hardware co-processing are formulated.

First of all, before designing a machine learning framework, it is necessary to formulate some basic rules for polymorphic software and hardware co-processing. Among them, the basic rules include labeling network modalities codes of data traffic and sending network modality flow tables, the data traffic including elephant flows and mouse flows, labeling the elephant flow as being processed by a hardware module ASIC chip or FPGA, sending the network modality flow tables of the elephant flows to the hardware module ASIC chip or FPGA, and labeling the mouse flow as being processed by a software module PPK.

In an embodiment, the known, conventional and fixed protocol data traffic is labeled as being processed by the hardware module ASIC chip/FPGA. It should be understood that the amount of this known, conventional and fixed protocol data traffic is usually large, accounting for about 80% of the network traffic, therefore it is generally called "elephant flows"; in addition, it is necessary to send the network modality flow table to the hardware module ASIC chip/FPGA, in which FPGA is the supplement of ASIC chip. For example, when the occupancy rate of the ASIC chip is monitored to be higher than 50%, the data traffic will be forwarded by FPGA; some irregular data traffic of new network modalities with a complex matching logic is labeled as being processed by a general software module PPK; it should be understood that the amount of this irregular data traffic of new network modalities with a complex matching logic is generally small, accounting for about 20% of the network traffic, therefore it is generally called "mouse flows". For example, when the data traffic type is a mouse flow, at this time, the modality codes of the data traffic will be identified due to the function of the labeling, and then processed by the general software module PPK.

It should be understood that all data flows in the network have flow tables, which correspond to the network modality flow table. Each entry in the network modality flow table represents which address the data flow is forwarded to, and the network modality flow table can be understood as a forwarding table in the network. The network modality flow table is sent to the hardware module ASIC chip/FPGA, and the switch can forward the corresponding data traffic to the corresponding address.

(2) Offline learning, in which the training configuration is designed to help capture different switching resource usage variables, and running of these experiments can produce the original data of a training classifier.
(2.1) A training benchmark obtained: according to the basic rules, the modality codes in various scenarios types are formulated as the benchmark and executed, so as to obtain the benchmark with the best performance which is beneficial to the allocation of switching resources. In an embodiment, according to the basic rules of manual pre-configuration in step (1), it needs to manually prepare several kinds of modality codes in massive business scenarios as the benchmark and execute them; then the optimal and best-performing switching resource allocation method can be found, and then the best-performing benchmark for switching resource allocation can be obtained on this basis, and is labeled to support offline training. Among them, the modality types include but are not limited to: spatial coordinate identification modality, identity identification modality, content identification modality, industrial control identification modality, IP identification modality etc.

It should be understood that different modality types are selected as categories of the benchmark, and the corresponding modality types of massive services can realize different selection for switching resource usage. For example, in some embodiments, the IP identification modality is selected as the category of the benchmark, and correspondingly, the massive services based on the IP identification modality can realize different selections for switching resource usage; in other embodiments, the industrial control identification modality can also be selected as the category of the benchmark, and correspondingly, the massive services based on the industrial control identification modality can realize different selections for switching resource usage; in other embodiments, the identity identification modality and the content identification modality can also be selected as the categories of the benchmark, and correspondingly, the massive services based on the identity identification modality and the content identification modality can realize different selections for switching resource usage.

(2.2) Extracting features. In an embodiment, a probe can be used to obtain the performance indices of a benchmark test in detailed operation, and features can be extracted according to the performance indices. The detailed operation process is the process of polymorphic network element processing modality services. Polymorphic network elements processing modality services needs to go through five stages, including modality code compilation, modality loading, packet parsing, flow table matching and packet forwarding. Corresponding to these five stages, a total of 30 non-zero performance values of corresponding parts are collected, and then the feature correlation and information acquisition technology is used to remove redundant features, 9 useful features are selected from these 30 non-zero performance values, and these 9 features are extracted. These 9 features include CPU occupancy, maximum bandwidth, average bandwidth, TCAM (ternary content addressable memory) occupancy, SRAM (Static Random-Access Memory) occupancy, PHV (Packet header vector) occupancy, flow table hit time, priority and traffic size.

(2.3) Model training. The features extracted in step (2.2) are used to evaluate a variety of classic machine learning classification algorithms. The machine learning classification algorithm can obtain the evaluation indices of the corresponding classifier model according to the classifier model algorithm, and the performance of the classifier model is determined through the evaluation indices; the evaluation indices include the prediction precision and the F1 measurement value. It should be understood that the classifier model includes but is not limited to: random forest, random tree, decision tree, support vector machine, linear regression and other classifiers. Because the selection of switching resources determined by the model is directly related to the modality execution time, the prediction precision of the classifier model and the measured value of F1 are taken as evaluation indices. In addition, in order to ensure the robustness of the model, the performance of the classifier model can be verified by 10 times cross-validation, and it is necessary to ensure that the model training covers all types of data. In this way, the collected data are classified through several basic classifier models, which is helpful to determine the present disclosure scenarios to which the classifier model is applicable, so that the classifier model can provide the best guidance for the use of switching resources for new network applications.

It should be noted that F-measure is a statistical magnitude, which is also called a F-Score. F-Measure is a weighted harmonic average of Precision and Recall, and is a commonly used evaluation standard in the field of IR (information retrieval) and is often used to evaluate the classifier model. In the F-measure function, when the parameter $\alpha=1$, F1 combines the results of Precision and Recall, and when F1 is higher, it shows that the test method is more effective. In this embodiment, the measured value of F1 is F1-Measure, and F1-Measure is an evaluation index, which is a comprehensive evaluation index based on both Precision and Recall.

In this embodiment, the machine learning classification algorithm is evaluated according to the extracted features, that is, the classifier model algorithm is evaluated, and the scenarios suitable for the classifier model is obtained. At this time, the performance is optimal, that is, different scenarios correspond to different classifier models, that is, different modality types correspond to different classifier models.

Further, when the corresponding modality type is selected as the training benchmark, the corresponding features are extracted, and various classical machine learning classification algorithms are evaluated according to the features, so that the corresponding prediction precision and an F1 measurement value can be obtained, and the scenarios to which the model is applicable can be determined according to the prediction precision and the F1 measurement value.

In an embodiment, for example, when the training benchmark selecting the spatial coordinate identification modality, the corresponding features are extracted, and the random forest classifier is evaluated according to the features to obtain the corresponding precision and the F1 measurement value, and the performance of the random forest classifier can be determined according to the prediction precision and the F1 measurement value; if the performance of the random forest classifier is not good, the support vector machine classifier can be evaluated according to the features, the corresponding prediction precision and the F1 measurement value can be obtained, and the performance of the support vector machine classifier can be determined according to the prediction and the F1 measurement value; if the performance of support vector machine classifier is not good, other types of classifiers are continually evaluated according to their features; if the performance of the support vector machine classifier is excellent, it can be determined that it is more suitable to choose the support vector machine classifier in the scenario when the modality type is spatial coordinate identification modality.

(3) Online reasoning. Switching resource allocation advises are obtained, and modality codes are updated according to the switching resource allocation advises.

(3.1) Collection of performance indices. In an embodiment, a probe can be used to obtain the performance indices and normalized indices of the 9 features extracted in step (2.2) from the running modality applications, and then the performance indices and normalized indices are combined into a feature vector. It is easy to conceive that the corresponding switching resource allocation can be determined according to the feature vector composed of these performance indices and normalized indices.

(3.2) Input into a model. Advises on switching resource allocation are obtained. The feature vector obtained in step (3.1) is delivered to the offline-trained model as an input, and the model will output its predicted switching resource allocation advises for each modality application. In an embodiment, the switch resource allocation advises includes four switch resource allocation advise options: no advise, PreferredLocation for ASIC, PreferredLocation for FPGA, and PreferredLocation for PPK.

In this embodiment, according to the optimal classifier model corresponding to different modality types obtained in step (2.3), when different modality types are selected, the corresponding feature vectors are extracted and input into the optimal classifier model corresponding to the modality types, and the classifier model outputs the predicted switching resource allocation advises.

In an embodiment, there are many modality types, such as spatial coordinate identification modality, identity identification modality, content identification modality, industrial control identification modality, IP identification modality etc. For example, in some embodiments, a category based on a spatial coordinate identification modality can be selected. When a category based on a spatial coordinate identification modality is selected, the feature vectors of the spatial coordinate identification modality is correspondingly transmitted to the offline-trained model as an input, and the model can determine and output corresponding switching resource allocation advises according to the feature vector of spatial coordinate identification modality. In other embodiments, a category based on the IP identification modality can also be selected. When a category based on the IP identification modality is selected, the feature vector of the IP identification modality is transmitted to the offline-trained model as an input accordingly, and the model can determine and output corresponding switching resource allocation advises according to the feature vector of the IP identification modality. In other embodiments, categories based on the identity identification modality and the content identification modality can also be selected. When the categories based on the identity identification modality and the content identification modality are selected at the same time, correspondingly, the feature vectors of the identity identification modality and the content identification modality are transmitted as inputs to the offline-trained model, and the model can determine and output corresponding switching resource allocation advises according to the feature vectors of the identity identification modality and the content identification modality.

Furthermore, the model outputs the predicted switching resource allocation advises according to the basic rules of manual pre-configuration. For example, when the CPU occupation of the feature vector in the category based on IP identification modality is higher than 50%, the corresponding switching resource allocation advise option will be displayed as PreferredLocation for FPGA. It should be understood that when the switch resource allocation modal output according to the basic rules with the feature vector as the input is optimal, correspondingly, the switching resource allocation advise option will be displayed as no advice; similarly, according to the actual situation, the switching resource allocation advise option also include PreferredLocation for ASIC and PreferredLocation for PPK, and the optimal switching resource allocation advises can be made according to different optimization objectives.

(3.3) Update of the modality codes. The original codes of the modality services are modified according to the switching resource allocation advises predicted in step (3.2), so as to realize an optimal selection of switch resource usage. In an embodiment, in the future, the original codes of the modality services can be modified by the tool from original codes to original codes, or the automatic updating of modality codes can be realized by switching between switching resource allocation advises through library support, and finally the optimized modality codes can be compiled and sent to the suggested switching resources.

The method in the present disclosure selects among ASIC switching chips, FPGA (Field Programmable Gate Array) and PPK (Polymorphic Process Kit) on polymorphic network elements based on machine learning, and trains a model offline using manual pre-configuration by network programmers and performance indices generated by an analyzer, which is helpful to obtain the most suitable classifier model for different application scenarios, which is then used to guide an optimal selection and use of network polymorphic applications at runtime, which is conducive to providing excellent advises for switching resource allocation for new applications; according to the present disclosure, I-type polymorphic network elements are used, so that flexible and efficient allocation of software/hardware switching resources on the polymorphic network element is realized, the performance of software/hardware collaborative design is optimized, and the allocation cost of polymorphic network resources is reduced. Further, the method is implemented simply, with flexible means, and the network service quality can be significantly guaranteed.

Corresponding to the embodiment of the method for optimizing allocation of switching resources in the polymorphic network, the present disclosure also provides an embodiment of an apparatus for optimizing allocation of switching resources in the polymorphic network.

Figure 2:
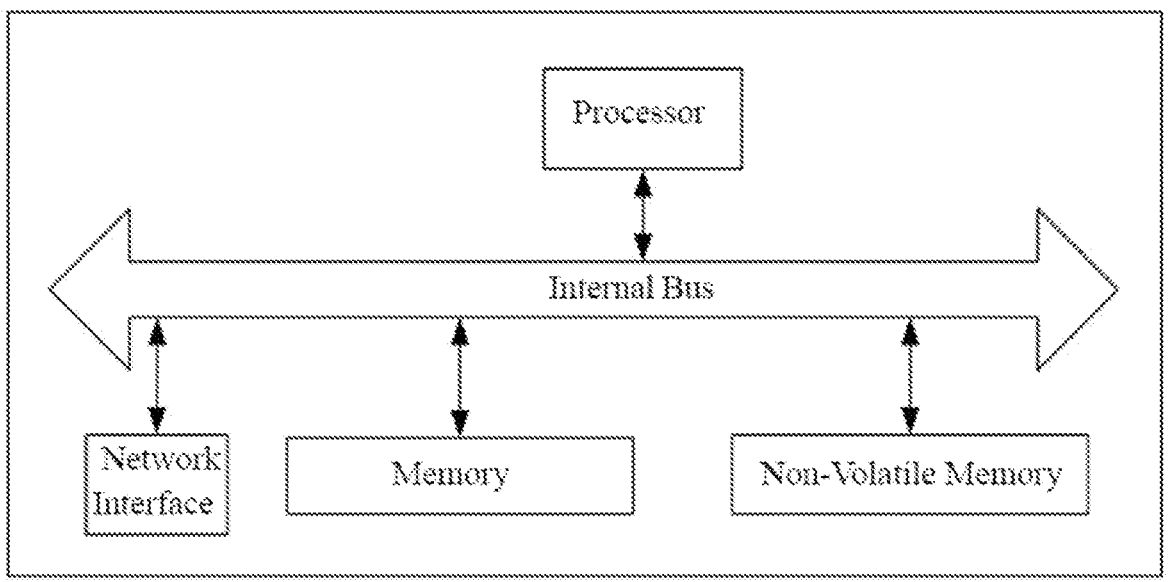
FIG. 2 is a schematic structural diagram of an apparatus for allocation of switching resources in the polymorphic network according to the present disclosure.

Referring to FIG. 2, an apparatus for optimizing allocation of switching resources in the polymorphic network provided by an embodiment of the present disclosure includes one or more processors, which are used to implement the method for optimizing allocation of switching resources in the polymorphic network in the above embodiment.

The embodiment of the apparatus for optimizing allocation of switching resources in the polymorphic network according to the present disclosure can be applied to any device with data processing capability, which can be an apparatus or device such as a computer. The embodiment of the apparatus can be implemented by software, or by hardware or a combination of hardware and software. Taking software implementation as an example, as a logical apparatus, it is formed by reading the corresponding computer program instructions in the non-volatile memory into the memory through the processor of any equipment with data processing capability. From the hardware level, as shown in FIG. 2, it is a hardware structure diagram of any equipment with data processing capability where the apparatus for optimizing allocation of switching resources in the polymorphic network according to the present disclosure is located. In addition to the processor, memory, network interface and nonvolatile memory shown in FIG. 2, any device with data processing capability where the apparatus is located in the embodiment usually includes other hardware according to the actual functions of the device with data processing capability, which will not be described here again.

The implementing process of the functions and actions of each unit in the above-mentioned apparatus is detailed in the implementing process of the corresponding steps in the above-mentioned method, and will not be repeated here.

For the apparatus embodiment, since it basically corresponds to the method embodiment, it is only necessary to refer to part of the description of the method embodiment for the relevant points. The apparatus embodiments described above are only schematic, in which the units described as separate components may or may not be physically separated, and the components displayed as units may or may not be physical units, that is, they may be located in one place or distributed to multiple network units. Some or all of the modules can be selected according to actual needs to achieve the purpose of the solution of the present disclosure. Those skilled in the art can understand and implement it without creative labor.

The embodiment of the present disclosure further provides a computer-readable storage medium, on which a program is stored. The program, when executed by a processor, implements the method for optimizing allocation of switching resources in the polymorphic network in the above embodiment.

The computer-readable storage medium can be an internal storage unit of any device with data processing capability as described in any of the previous embodiments, such as a hard disk or a memory. The computer-readable storage medium can also be any equipment with data processing capability, such as a plug-in hard disk, a Smart Media Card (SMC), an SD card, a Flash Card and the like. Further, the computer-readable storage medium can also include both internal storage units of any equipment with data processing capability and external storage devices. The computer-readable storage medium is used for storing the computer program and other programs and data required by any equipment with data processing capability, and can also be used for temporarily storing data that has been output or will be output.

The above embodiments are only used to illustrate, but not to limit the technical solution of the present disclosure; although the present disclosure has been described in detail with reference to the foregoing embodiments, those skilled in the art should understand that it is still possible to modify the technical solution described in the foregoing embodiments, or to replace some technical features with equivalents; however, these modifications or substitutions do not make the essence of the corresponding technical solutions deviate from the spirit and scope of the technical solutions of various embodiments of the present disclosure.

What is claimed is:

1. A method for optimizing allocation of switching resources in a polymorphic network, comprising:
   step (1) manual pre-configuration, formulating a basic rule for polymorphic network software and hardware co-processing, wherein the basic rule comprises labeling network modality codes of data traffic and sending network modality flow table, the data traffic comprises elephant flows and mouse flows, labeling the elephant flow as being processed by a hardware module application specific integrated circuit (ASIC) chip or field programmable gate array (FPGA), sending the network modality flow table of the elephant flow to the hardware module ASIC chip or FPGA, and labeling the mouse flow as being processed by a software module polymorphic process kit (PPK);
   step (2) offline learning, designing a training configuration in an offline learning stage to capture different switching resource usage variables, and running experiments to generate an original data of a training classifier; and
   step (3) online reasoning, obtaining switching resource allocation advises, and updating modality codes according to the switching resource allocation advises.

2. The method for optimizing allocation of switching resources in a polymorphic network according to claim 1, wherein the step (2) comprises:
   step (2.1) obtaining a training benchmark: according to the basic rules, formulating the modality code in various scenarios types as the training benchmark and executing the training benchmark, so as to obtain the training benchmark with a best performance facilitating the allocation of switching resources;
   step (2.2) extracting features: using a probe to obtain a performance indice of a benchmark test in a detailed operation, and extracting the features according to the performance indice, wherein the detailed operation comprises five stages of a processing modality services by a polymorphic network element, and the five stages comprise modality code compilation, modality loading, packet parsing, flow table matching and packet forwarding; and
   step (2.3) training a model: extracting the features using the performance indice extracted in the step (2.2) to evaluate various classifier models, obtaining an evaluation indice of a classifier model, and determining performance of the classifier model according to the evaluation indice.

3. The method for optimizing allocation of switching resources in a polymorphic network according to claim 2, wherein the modality types comprise spatial coordinate identification modality, content identification modality, industrial control identification modality and IP identification modality.

4. The method for optimizing allocation of switching resources in a polymorphic network according to claim 2, wherein the features comprise central processing unit (CPU) occupation, maximum bandwidth, average bandwidth, ternary content addressable memory (TCAM) occupation, static random-access memory (SRAM) occupation, packet header visibility (PHV) occupation, flow table hit time, priority and traffic size.

5. The method for optimizing allocation of switching resources in a polymorphic network according to claim 2, wherein the classifier models comprise random forest, random tree, decision tree, support vector machine and linear regression.

6. The method for optimizing allocation of switching resources in a polymorphic network according to claim 2, wherein the evaluation indice comprises prediction precision and an F1 measurement value.

7. The method for optimizing allocation of switching resources in a polymorphic network according to claim 2, wherein the performance of the classifier models is verified by a method of 10 times cross validation to ensure that the training for the classifier models covers all types of data.

8. The method for optimizing allocation of switching resources in a polymorphic network according to claim 1, wherein the step (3) comprises:
   step (3.1) collecting a performance indice: obtaining the performance indice and a normalized indice by a probe when features are running, and combining the performance indice and the normalized indice into one feature vector;
   step (3.2) inputting a model: obtaining the switching resource allocation advises, and inputting the feature vector into the model trained offline, wherein the model outputs the predicted switching resource allocation advises, and the switching resource allocation advises comprise: no advise, PreferredLocation for ASIC, PreferredLocation for FPGA and PreferredLocation for PPK; and step (3.3) updating the modality codes: modifying a modality application original code according to the switching resource allocation advises to select an optimal utilization of switching resources.

9. An apparatus for optimizing allocation of switching resources in a polymorphic network, comprising one or more processors for implementing the method for optimizing allocation of switching resources in a polymorphic network according to claim 1.

10. A non-transitory computer-readable storage medium on which a program is stored, wherein the program, when executed by a processor, is configured to implement the method for optimizing allocation of switching resources in a polymorphic network according to claim 1.

* * * * *